(12) United States Patent
Weckert

(10) Patent No.: US 11,456,690 B2
(45) Date of Patent: Sep. 27, 2022

(54) PULSE-CONTROLLED INVERTER WITH A VARIABLE SPEED-DEPENDENT SWITCHING FREQUENCY

(71) Applicant: ebm-papst Mulfingen GmbH & Co. KG, Mulfingen (DE)

(72) Inventor: Marco Weckert, Bad Mergentheim (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 0 days.

(21) Appl. No.: 17/172,172

(22) Filed: Feb. 10, 2021

(65) Prior Publication Data

US 2021/0257952 A1    Aug. 19, 2021

(30) Foreign Application Priority Data

Feb. 14, 2020    (DE) ...................... 10 2020 103 973.5

(51) Int. Cl.
*H02P 27/08*    (2006.01)
*H02P 23/14*    (2006.01)

(52) U.S. Cl.
CPC .............. *H02P 27/08* (2013.01); *H02P 23/14* (2013.01)

(58) Field of Classification Search
CPC .......... H02P 27/00; H02P 27/04; H02P 27/06; H02P 27/047; H02P 27/08; H02P 27/085; H02P 27/18; H02P 23/00; H02P 23/0027; H02P 23/0086; H02P 23/03; H02P 23/14; H02P 23/18; H02P 23/28; H02P 21/00; H02P 21/0021; H02P 21/0085; H02P 21/04; H02P 21/18; H02P 21/22; H02P 25/062; H02P 7/29; H02P 6/00; H02P 6/005; H02P 6/04; H02P 6/08; H02P 6/10; H02P 6/16; H02P 6/17; H02P 6/32; H02P 1/00; H02P 1/04; H02P 1/16; H02P 1/18; H02P 1/24; H02P 1/26; H02P 1/30; H02P 1/42; H02P 1/426; H02P 1/46; H02P 1/465

See application file for complete search history.

(56) References Cited

U.S. PATENT DOCUMENTS

| 8,583,265 B1 * | 11/2013 | Schulz ................. H02P 23/009 |
| | | 318/400.14 |
| 10,951,153 B2 * | 3/2021 | Lee .......................... H02P 21/22 |

FOREIGN PATENT DOCUMENTS

DE    19748479 C1    4/1999

* cited by examiner

*Primary Examiner* — Antony M Paul
(74) *Attorney, Agent, or Firm* — Harness, Dickey & Pierce, P.L.C.

(57) ABSTRACT

A pulse-controlled inverter with a variably controlled switching frequency for generating a sinusoidal alternating current for a motor. A control device is provided to control the switching frequency $f_{switch}$ of the pulse-controlled inverter as a function of the speed n of the motor.

13 Claims, 2 Drawing Sheets

PULSE-CONTROLLED INVERTER WITH A VARIABLE SPEED-DEPENDENT SWITCHING FREQUENCY

CROSS-REFERENCE TO RELATED APPLICATION

This application claims the benefit and priority of German Application No. 102020103973.5, filed Feb. 14, 2020. The entire disclosure of the above application is incorporated herein by reference.

FIELD

The present disclosure relates to a method for operating a pulse-controlled inverter and a pulse-controlled inverter with a variable speed-dependent switching frequency.

BACKGROUND

It is known in various applications in the field of drive technology to use a DC voltage intermediate circuit for variable-speed operation of the electric drive, as well as a downstream pulse-controlled inverter as a frequency converter. Such a DC voltage intermediate circuit serves as an energy storage device for decoupling the supply network. The AC voltage, which is rectified, from the inverter which supplies the electric drive with AC voltage of variable frequency. This circuit topology enables a large speed range, since the DC voltage intermediate circuit causes the rotor speed to be completely decoupled from the mains frequency.

Known pulse-controlled inverters have a constant switching frequency or cycle duration (also called pulse frequency). The desired voltage form (sine wave, block, . . . ) of the voltage to be generated is formed as a series of mean values over a pulse period of the alternating voltage generated via the ratio of the switch-on or switch-off time, respectively. The cycle time where the switches are switched on and off is constant and limited by the power loss of the pulse-controlled inverter.

Such inverters are mostly used to supply three-phase machines, as a mean value over a pulse period with sinusoidal voltages of variable frequency and amplitude. Pulse-controlled inverters of this type are also used to convert the alternating voltage generated by a synchronous generator, for example, into a mains voltage of a fixed frequency and amplitude. By rectifying the generator voltage and buffering it in the intermediate circuit, the synchronous generator can be operated at variable speed, since the generator speed is again decoupled from the mains frequency.

DE 19748479 C1 discloses a pulse-controlled inverter with variable pulse frequency for generating a sinusoidal alternating current. The pulse frequency changes depending on the course of the alternating current to be generated. Thus, the pulse frequency in the zero crossing of the alternating current to be generated is multiple times greater than in the range of the maximum amplitude of the alternating current.

In classic industrial applications, frequency converters are operated by means of variable pulse frequencies to protect against overheating and to prevent overheating shutdown. The basis for this is either direct temperature detection or coupling to the output current.

This is to ensure that the frequency converter can achieve a higher output power through low switching losses without overheating. Another idea of varying the switching frequency is to keep the temperature of the power semiconductors as constant as possible, which has a positive effect on the service life of the power stage. But this requires that static and dynamic temperature levels are calculated in advance.

SUMMARY

It is desirable to further develop a pulse-controlled inverter in such a way that an increase in output is possible, taking into account the temperature requirements and the limit temperature of the electronics, without complex technical means.

The underlying object of the present disclosure is therefore overcoming the aforementioned disadvantages in the prior art and proposing an optimized pulse-controlled inverter operation.

This object is achieved by a pulse-controlled inverter with variably controlled switching frequency for generating a sinusoidal alternating current for a motor comprising: providing a control device designed to regulate the switching frequency $f_{switch}$ of the pulse-controlled inverter as a function of the speed (n) of the motor.

According to the disclosure, a pulse-controlled inverter with a variably controlled switching frequency for generating a sinusoidal alternating current for a motor is proposed. A control device is provided to set the switching frequency $f_{switch}$ of the pulse-controlled inverter as a function of the speed (n) of the motor. Thus, a variable switching frequency depending on the speed can be achieved for the desired speed ranges of the motor.

In a preferred embodiment of the disclosure, the switching frequency $f_{switch}$ of the pulse-controlled inverter at low speeds in the speed range of the coupled motor is at least a frequency of 16 kHz or above and decreases with increasing speed. Particularly in the case of fan drives, the output is provided by the pulse-controlled inverter. Thus, the power loss increases with increasing speed.

It is further advantageous if the switching frequency $f_{switch}$ of the pulse-controlled inverter is directly coupled to the detected speed of the operated motor. Accordingly, the current speed n is the manipulated variable for regulating the switching frequency of the pulse-controlled inverter.

In a first advantageous disclosure, the switching frequency $f_{switch}$ of the pulse-controlled inverter is regulated linearly with the speed (n) of the coupled motor. Due to the linear control, the switching frequency $f_{switch}$ of the pulse-controlled inverter is steadily reduced from an initial value as the speed increases.

In an alternative solution of the disclosure, the switching frequency $f_{switch}$ of the pulse-controlled inverter is controlled by a step function having one or multiple steps based on the speed (n) of the coupled motor. A fixed switching frequency $f_{switch,i}$ of the pulse-controlled inverter is selected for a predetermined speed range $(n_i)$. In this way, a number of control steps can be configured in order to set only one predefined value for the corresponding switching frequency $f_{switch}$ for each specific speed window. Here, a hysteresis can also be placed around the switchover points $n_i$ in order to prevent very frequent switchovers.

It is also possible to control the switching frequency $f_{switch}$ of the pulse-controlled inverter according to a non-linear function as a function of the speed (n) of the coupled motor. In this way, a very specific switching frequency curve for the pulse-controlled inverter can also be implemented in accordance with a predefined speed-dependent algorithm function.

In another advantageous embodiment of the disclosure, particularly for a current measurement, a step function as described above is preferably controlled by the control device. This is advantageous for a deterministic drive behavior if synchronization of the control to the PWM frequency is to be frequently used, since the current measurement must be taken at certain times within the PWM period.

Another aspect of the present disclosure relates to a method for operating a pulse-controlled inverter coupled to a motor (as previously described). Here the rotational speed (n) of the motor is detected. The control device is supplied as an input variable, that controls the switching frequency $f_{switch}$ of the pulse-controlled inverter as a function of the speed (n) of the motor.

Other advantageous further developments of the disclosure are characterized in the dependent claims and will be described in greater detail below, together with the description of the preferred embodiment of the disclosure with reference to the figures.

DRAWINGS

The drawings described herein are for illustrative purposes only of selected embodiments and not all possible implementations, and are not intended to limit the scope of the present disclosure.

DETAILED DESCRIPTION

The disclosure is described in more detail below using an exemplary embodiment with reference to FIGS. 1 to 4.

The graphics show the dependency of the switching frequency $f_{switch}$ of a pulse-controlled inverter 1 connected to a fan 2 as a function of the speed n of the fan.

Figure 1:
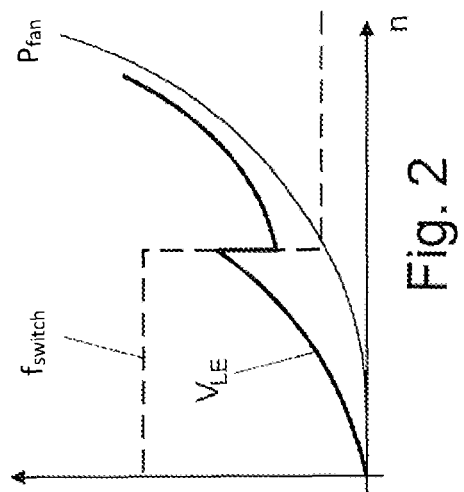
FIG. 1 is a schematic view of a control curve where linear control as a function of the speed (n) of the motor is implemented, and further the profile of the motor output $P_{fan}$ is plotted.

FIG. 1 shows a control curve where a linear control depending on the speed n of the motor 3 is implemented. In a first speed range up to a speed ($n_1$), a constant switching frequency $f_{switch}$ is used, which then decreases linearly up to a speed ($n_2$) and continues at a constant low switching frequency $f_{switch}$. Furthermore, the corresponding profile of the motor output $P_{fan}$ is plotted as an example, which increases to the power of three with respect to the speed.

Figure 2:
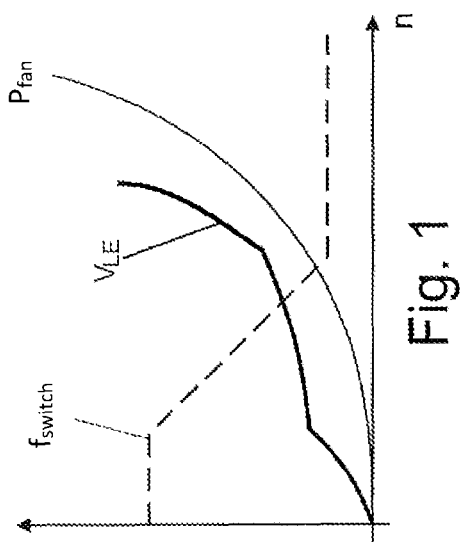
FIG. 2 is a schematic view of a control curve where a stepped control is implemented as a function of the speed n of the motor, and further the profile of the motor output $P_{fan}$ is plotted.

FIG. 2 shows a control curve where a stepped profile depending on the speed n of the motor is implemented. In a first speed range up to a speed $n_1$, a constant switching frequency $f_{switch}$ is used. It is then sharply reduced and continued at a constant low switching frequency $f_{switch}$. Furthermore, the corresponding profile of the motor output $P_{fan}$ is plotted for this purpose.

Figure 3:
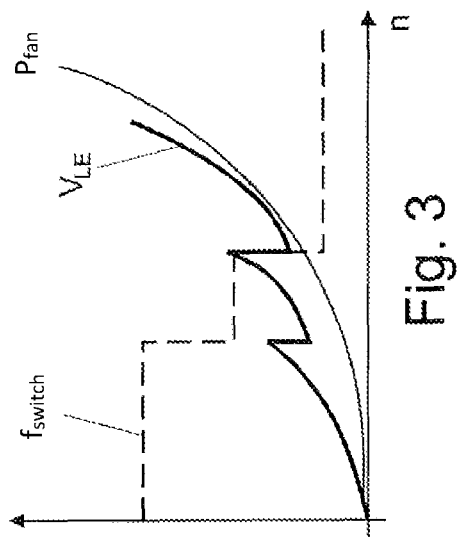
FIG. 3 is a view of an alternative control curve where a multi-stepped control as a function of the speed n of the motor is implemented.

FIG. 3 shows a control curve similar to FIG. 2. Here, however, a two-tiered control profile depending on the speed n of the motor is implemented. In a first speed range up to a speed $n_1$, a constant switching frequency $f_{switch}$ is used. It is then abruptly reduced and continued at a constant low switching frequency $f_{switch}$ up to a speed $n_2$. This switching frequency $f_{switch}$ is then again abruptly reduced by a certain value when the speed $n_2$ is reached and continues at a constant switching frequency $f_{switch}$ that is still low. Furthermore, the corresponding profile of the motor output $P_{fan}$ is plotted. It has an output jump at the respective jump in the profile of the switching frequency $f_{switch}$.

Figure 4:
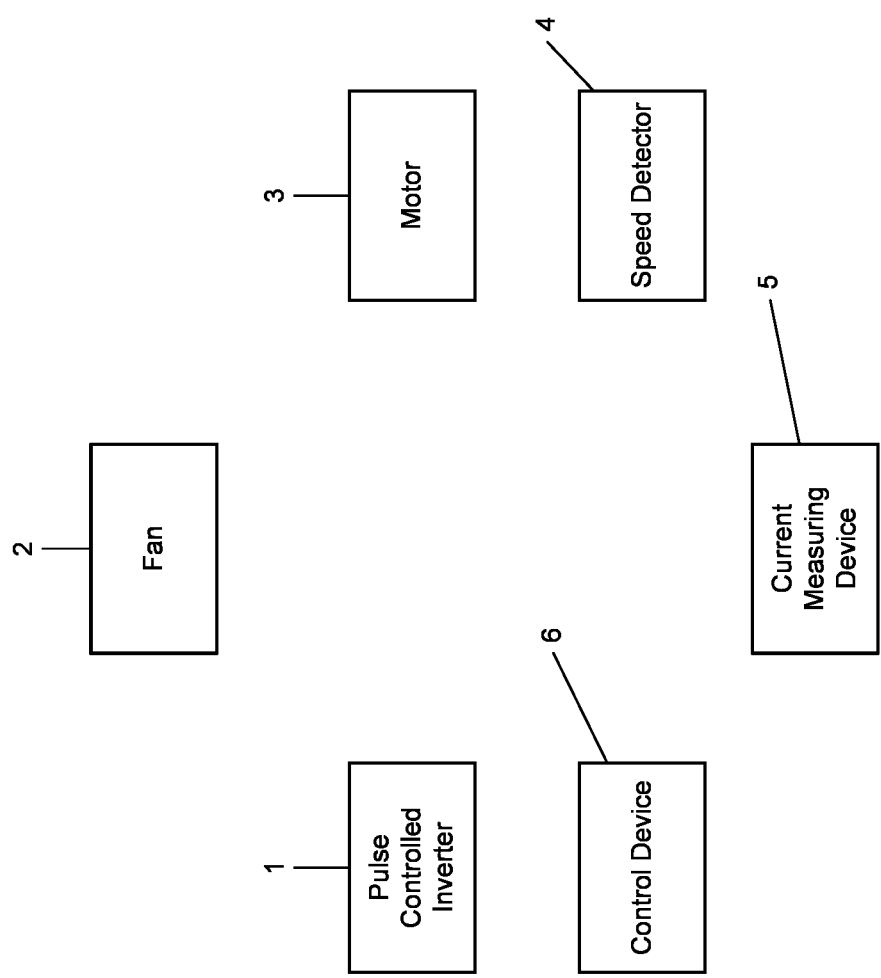
FIG. 4 is a block diagram including example components described herein.

FIG. 4 is a block diagram diagram including example components described herein including a pulse controlled inverter 1, a fan 2, a motor 3, a speed detector 4, a current measuring device 5, and a control device 6.

The disclosure is not limited in its execution to the preferred exemplary embodiments described above. Instead, a number of variants is conceivable, which make use of the presented solution even for fundamentally different designs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A pulse-controlled inverter with variably controlled switching frequency for generating a sinusoidal alternating current for a motor comprising:
   a control device is provided and designed as intended to regulate the switching frequency $f_{switch}$ of the pulse-controlled inverter as a function of the speed n of the motor,
   wherein the switching frequency $f_{switch}$ of the pulse-controlled inverter is directly coupled to the detected speed of the operated motor, and
   wherein the switching frequency $f_{switch}$ of the pulse-controlled inverter is controlled according to a step function having one or more steps based on the speed n of the coupled motor, wherein a fixed switching frequency $f_{switch,i}$ of the pulse-controlled inverter is set for a predetermined speed range $n_i$.

2. The pulse-controlled inverter according to claim 1, wherein the switching frequency $f_{switch}$ of the pulse-controlled inverter at low speeds is within the speed range of the motor above a defined frequency.

3. The pulse-controlled inverter according to claim 1, wherein the switching frequency $f_{switch}$ of the pulse-controlled inverter at high speeds is in the range of the speed range of the motor.

4. The pulse-controlled inverter according to claim 1, wherein the switching frequency $f_{switch}$ of the pulse-controlled inverter is controlled linearly with the speed n of the coupled motor.

5. The pulse-controlled inverter according to claim 1, wherein the switching frequency $f_{switch}$ of the pulse-controlled inverter is controlled according to a non-linear function as a function of the speed n of the coupled motor.

6. The pulse-controlled inverter according to claim 1, wherein the current is measured using a current measuring device.

7. A method for operating a pulse-controlled inverter coupled to a motor according to claim 1 wherein the speed n of the motor is recorded and fed to the control device as an input variable, and the control device controls the switching frequency $f_{switch}$ of the pulse-controlled inverter as a function of the speed n of the motor.

8. A pulse-controlled inverter with variably controlled switching frequency for generating a sinusoidal alternating current for a motor comprising:
 a control device is provided and designed as intended to regulate the switching frequency $f_{switch}$ of the pulse-controlled inverter as a function of the speed n of the motor,
 wherein the switching frequency $f_{switch}$ of the pulse-controlled inverter is directly coupled to the detected speed of the operated motor, and
 wherein the switching frequency $f_{switch}$ of the pulse-controlled inverter is controlled according to a non-linear function as a function of the speed n of the coupled motor.

9. The pulse-controlled inverter according to claim 8, wherein the switching frequency $f_{switch}$ of the pulse-controlled inverter at low speeds is within the speed range of the motor above a defined frequency.

10. The pulse-controlled inverter according to claim 8, wherein the switching frequency $f_{switch}$ of the pulse-controlled inverter at high speeds is in the range of the speed range of the motor.

11. The pulse-controlled inverter according to claim 8, wherein the switching frequency $f_{switch}$ of the pulse-controlled inverter is controlled linearly with the speed n of the coupled motor.

12. The pulse-controlled inverter according to claim 8, wherein the current is measured using a current measuring device.

13. A method for operating a pulse-controlled inverter coupled to a motor according to claim 8 wherein the speed n of the motor is recorded and fed to the control device as an input variable, and the control device controls the switching frequency $f_{switch}$ of the pulse-controlled inverter as a function of the speed n of the motor.

\* \* \* \* \*